United States Patent

Smith

[15] 3,659,080

[45] Apr. 25, 1972

[54] PHOTO-ELECTRIC READER AND FREQUENCY TONE CODE CONVERTER

[72] Inventor: Lawrence Jerome Smith, Stamford, Conn.

[73] Assignee: Pitney-Bowes, Inc., Stamford, Conn.

[22] Filed: July 10, 1970

[21] Appl. No.: 53,835

[52] U.S. Cl. ....................235/61.11 E, 179/2 DP, 340/171 A

[51] Int. Cl. ..........................................................G06k 7/10

[58] Field of Search .................340/146.3 AG, 171, 347 DD, 340/171 A; 179/2 DP, 90 K, 6.3 CC; 235/61.115, 61.113, 61.111, 61.11; 178/17 D

[56] References Cited

UNITED STATES PATENTS

| | | | |
|---|---|---|---|
| 3,303,329 | 2/1967 | Fritz | 235/61.11 |
| 3,028,081 | 4/1962 | Knight | 235/61.11 E |

OTHER PUBLICATIONS

IBM Technical Disclosure Bulletin entitled " Automatic Threshold Correction Circuit," by Villante, Vol. 5, No. 6, Nov. 1962, pages 55, 56.

*Primary Examiner*—Thomas A. Robinson
*Attorney*—William D. Soltow, Jr., Albert W. Scribner, Martin D. Wittstein and Louis A. Tirelli

[57] ABSTRACT

A photo-electric telephone dialing code reader which overcomes signal-to-noise ratio, optical hum and poor pulse waveform problems by averaging all the individual code channel bit sensing outputs to derive a floating reference level, against which it compares each individual channel bit sensing output. This technique is used to sense one bit out of the A code group, and one bit out of the B code group, and the individual A and B outputs are applied to respective frequency-determining inputs of a two-frequency-tone (telephone dialing type) encoder so that a decimal digit represented by the resulting tones can be transmitted to any data utilization equipment on premises or at the other end of a conventional telephone link.

9 Claims, 6 Drawing Figures

INVENTOR
LAWRENCE JEROME SMITH
BY
Martin D. Wittstein
ATTORNEY

INVENTOR.
LAWRENCE JEROME SMITH
BY Martin R. Wettstein
ATTORNEY

INVENTOR.
LAWRENCE JEROME SMITH
BY Martin P. Wettstein
ATTORNEY

INVENTOR.
LAWRENCE JEROME SMITH
BY Martin D. Wittstein
ATTORNEY

PHOTO-ELECTRIC READER AND FREQUENCY TONE CODE CONVERTER

Field of the Invention

This invention relates generally to both the photo-electric sensing and data encoding arts. It is particularly concerned with a device for automatic reading of credit cards, bank checks, or or other documents imprinted with luminescent spot codes; and transmission of the resulting numerical information in the form of frequency tone telephone dialing code.

THE PRIOR ART

Wallet-sized plastic credit cards have become an important medium of exchange in the economy of this country. But such cards are subject to various types of abuse, such as the use of outdated, cancelled, lost, stolen, altered or otherwise unauthorized cards. One way of dealing with this problem is to install, at the retail stations where credit cards are presented, automatic credit card verifiers which read an identifying number printed in coded form on each credit card, and relay it over conventional telephone lines to a computer located at a central station. The computer then checks the status of the card and provides a rapid response, indicating whether it is or is not acceptable.

One particularly desirable system for putting machine-readable identification numbers on the credit cards employs a special code imprinted thereon in the form of luminescent spots at various locations. The advantage of this approach is that such spots are not visible under ordinary light, but are readily detectable by virtue of their luminescence when illuminated by an ultra-violet source.

Luminescent spot encoding has advantages also as a method of encoding bank checks, in order to make them readable by automatic or equipment of the type which is now common in the banking field. By comparison to the magnetic ink and optical character recognition techniques usually employed in such equipment, the luminescent spot code approach is more reliable when the checks are soiled, crumpled, or partially mutilated.

This invention is concerned with the design of an automatic reading device usable in a credit card verifier, bank check processor, of other data processing equipment, which senses a luminescent spot code on the credit card, bank check, or other document, and converts the information into conventional telephone frequency code form. In the case of a credit card verifier, this permits the card identification number to be encoded for accurate transmission over telephone lines to the central computer station, where verification of the credit card is accomplished. And in the case of a processor for bank checks or other documents, it permits the data imprinted on the document to be passed along in convenient form to any ultimate data utilization device, either on the premises or at the other end of a telephone link.

The design of a luminescent spot code reader entails certain problems. One of these relates to signal-to-noise ratio, which is often low in credit card and bank check reading applications, because the cards and checks are carried around in customers'pockets or wallets, where they may pick up various stains and discolorations. Gasoline credit cards in particular are used in an environment where oil and grease stains are common.

An even more severe problem arises from the fact that ultra-violet illumination is required to make the code spot luminesce. There are incandescent filament lamps which radiate strongly in the ultra-violet range, but they suffer from short and unpredictable lifetimes, and are therefore undesirable for use in this type of equipment.

The usual choice for luminescent reading applications is a fluorescent gas lamp which radiates strongly in the ultra-violet region; but this type of ultra-violet source introduces other problems. When such a gas lamp is energized by raw alternating current drawn directly from power lines (the most convenient design approach), an "optical hum" is generated. Each time the AC waveform crosses zero, i.e., twice per cycle, the fluorescent lamp turns almost completely off. Therefore its light output has a hum, or ripple component at twice the frequency of the power line. Thus, when the lamp is energized by conventional 60-cycle alternating current, a 120-cycle optical hum is generated; and the amplitude of this hum component is largely unpredictable, because of such factors as lamp aging and power line voltage variations. Consequently, it has an adverse effect on the reliability of the photo-electric reading circuitry, because the luminescent spot discrimination level is uncertain.

One way of eliminating this optical hum is to energize the fluorescent lamp from a DC source; but in the usual situation where the local power supply is AC, costly rectifying and filtering circuitry is needed to develop low ripple DC, and an expensive polarity-reversing relay is needed to distribute the mercury vapor inside the lamp, and thus obtain reasonable lamp life.

A third problem, encountered in all spot code readers of this kind, results from the fact that, as the coded document is advanced relatively slowly past the photo-electric reading station for scanning purposes, the resulting output waveform is quite rounded; i.e. it is a poor pulse shape with long rise times.

THE INVENTION

To deal with all these problems, the present invention provides a multi-channel code reader having a plurality of channel reading circuits, one for each channel (or bit position) of the code. Each of these reading circuits has an individual bit sensing means and comparator. In addition, there is a common summing device which responds to the outputs of all the individual channel bit sensing means, and cooperates with other circuitry to provide an output which constitutes a "floating" reference level that is proportional to the average of all the individual bit sensing means outputs. The comparator for each individual channel reading circuit is arranged to compare the individual bit sensing output for its own channel with the floating reference level.

Then, the effects of poor signal-to-noise ratios, optical hum, and poor digital waveforms are effectively cancelled out, because they affect both sides of the comparison equally. Instead of comparing each individual channel reading output to a fixed reference level which ignores the factors affecting signal output level, it is compared to a reference level which varies in a manner reflecting the same factors that affect the individual channel output levels.

The resulting comparison output is applied to the input of a conventional telephone dialing code converter, of the type which translates numerical information into frequency tones for transmission over voice grade telephone lines. In the specific context of a credit card verifier device, the numerical information thus translated is transmitted over such telephone lines to the central computer station where the acceptability of the credit card is determined. In a bank check processing or other document processing environment, the numerical information can be transmitted in this telephone code format over ordinary data cable to data processing equipment on the premises, or over telephone lines to data processing equipment at any remote location.

BRIEF DESCRIPTION OF THE DRAWINGS

FIG. 3, consisting of FIGS. 3A and 3B, is an overall functional block and schematic circuit diagram of a complete document reading and telephone encoding circuit in accordance with this invention, which is usable in data processing systems generally, including the systems of FIGS. 1 and 2.

FIG. 4 is a diagram illustrating the manner in which FIGS. 3A and 3B are assembled to form FIG. 3.

DETAILED DESCRIPTION OF THE PREFERRED EMBODIMENT

Figure 1:
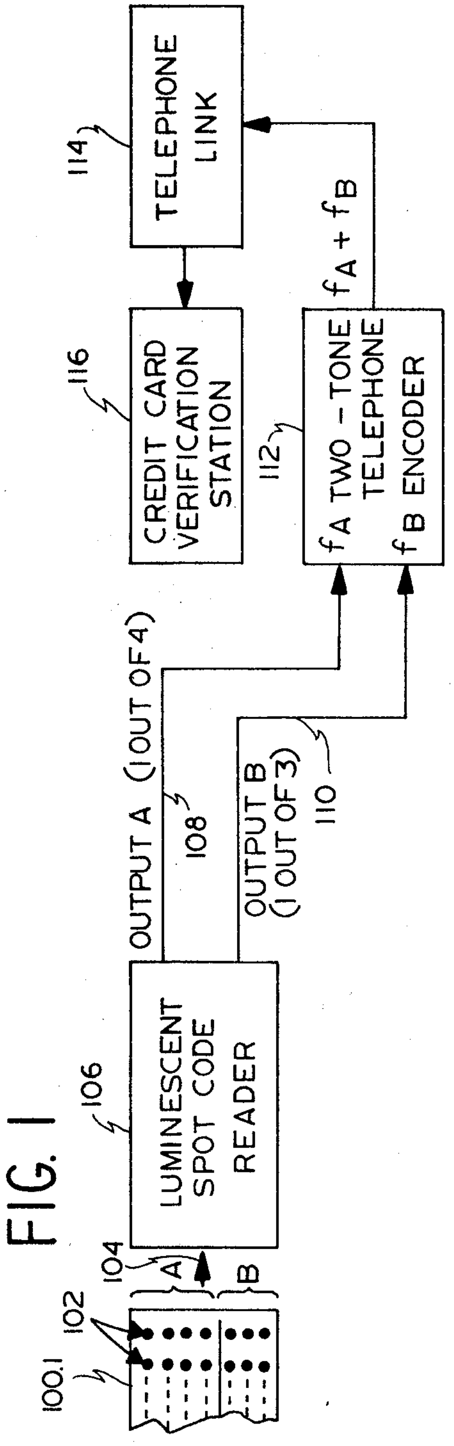
FIG. 1 is an overall block diagram of a luminescent spot code credit card verification system in accordance with this invention.

The system illustrated in FIG. 1 is designed to verify the acceptability of a credit card 110.1, which is imprinted with a multi-digit identifying number in the form of a code wherein respective digits of the number are represented by respective columns 102 of luminescent spot positions. Each column 102 is divided into two code groups designated A and B respectively, which represent respective frequency tones *f*A and *f*B of a two-tone frequency code. As indicated by arrow 104, the card 100.1 is fed through a reader device 106 for scanning purposes, permitting the reader to generate two outputs 108 and 110, which designate the one bit position which is occupied by luminescent spot out of the four bit positions in code group A, and the one bit position which is occupied by a luminescent spot out of the three bit positions in code group B, respectively.

These outputs are applied to respective frequency-selecting inputs *f*A and *f*B of a conventional telephone encoder circuit 112. This device, which is readily available from the local telephone company, employs the well-known two-tone telephone dialing code, in which the decimal numerals one through zero are each represented by a particular combination of two frequency tones: *f*A, selected from a group of four tones *f*A1 through *f*A4, in accordance with the luminescent-printed bit position of code group A; and *f*B, selected from a group of three tones *f*B1 through *f*B3, in accordance with the luminescent-printed bit positions of code group B. This code, which the Bell Telephone System calls "Touch-tone," is widely used for telephone switching purposes in automatic and push-button telephone "dialing" equipment; and it is also used for numerical data transmission over telephone lines, since it has the advantage of being resistant to degradation by noisy and/or narrow bandwidth transmission channels. Thus, in the credit card system of FIG. 1, the two-tone frequency coded signal " *f*A plus *f*B" is an ideal form in which to transmit a credit card identification number over a telephone link 114 to a computer station 116, where verification of the credit card 100.1 is accomplished.

Figure 2:
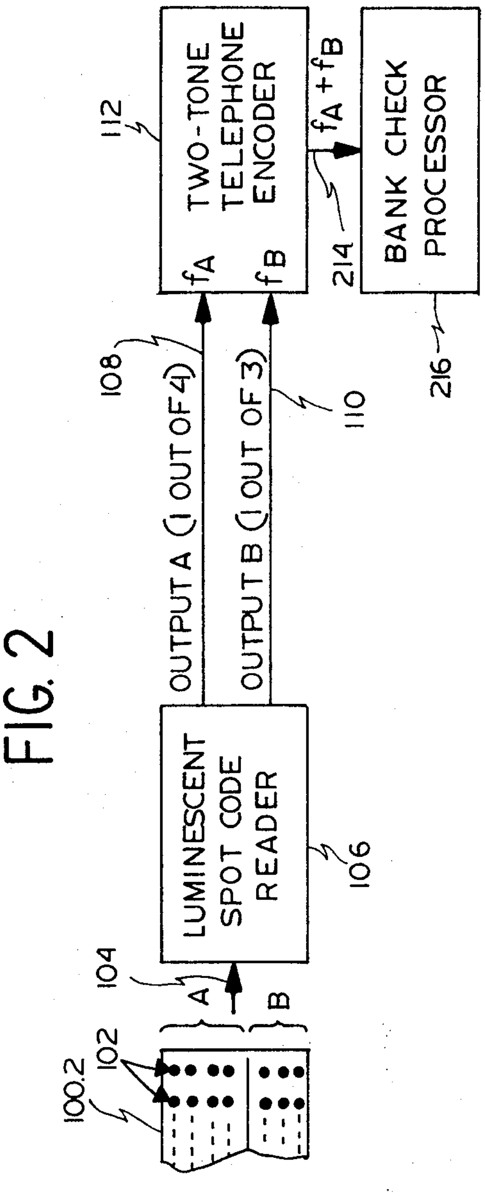
FIG. 2 is an overall block diagram of a luminescent spot code bank check processing system, also in accordance with this invention.

The system of FIG. 2 is quite similar, but is designed for processing a document such as a bank check 100.2. Here the necessary processing information is imprinted on the document in the same form, i.e., one luminescent spot code column 102 for each character, and each column comprising the same one-out-of- four and one-out-of-three code groups A and B respectively, for selecting respective frequency tones *f*A and *f*B. Arrow 104 indicates that the document 100.2 is fed through the same luminescent spot reader 106 for scanning purposes, enabling the reader to deliver the same A and B frequency-determining outputs 108 and 110 to the same telephone type of frequency encoder 112, which provides a two-tone output *f*A plus *f*B, representing the check or other document-processing information. That information is then relayed over a transmission channel 214 to check-processing or other document-processing equipment 216. The processor 216 may be on the same premises, in which case the transmission channel 214 would most likely be a simple data cable; or it may be at a remote location, in which case the transmission channel 214 would normally be a telephone link, just as in FIG. 1.

Figure 3A:
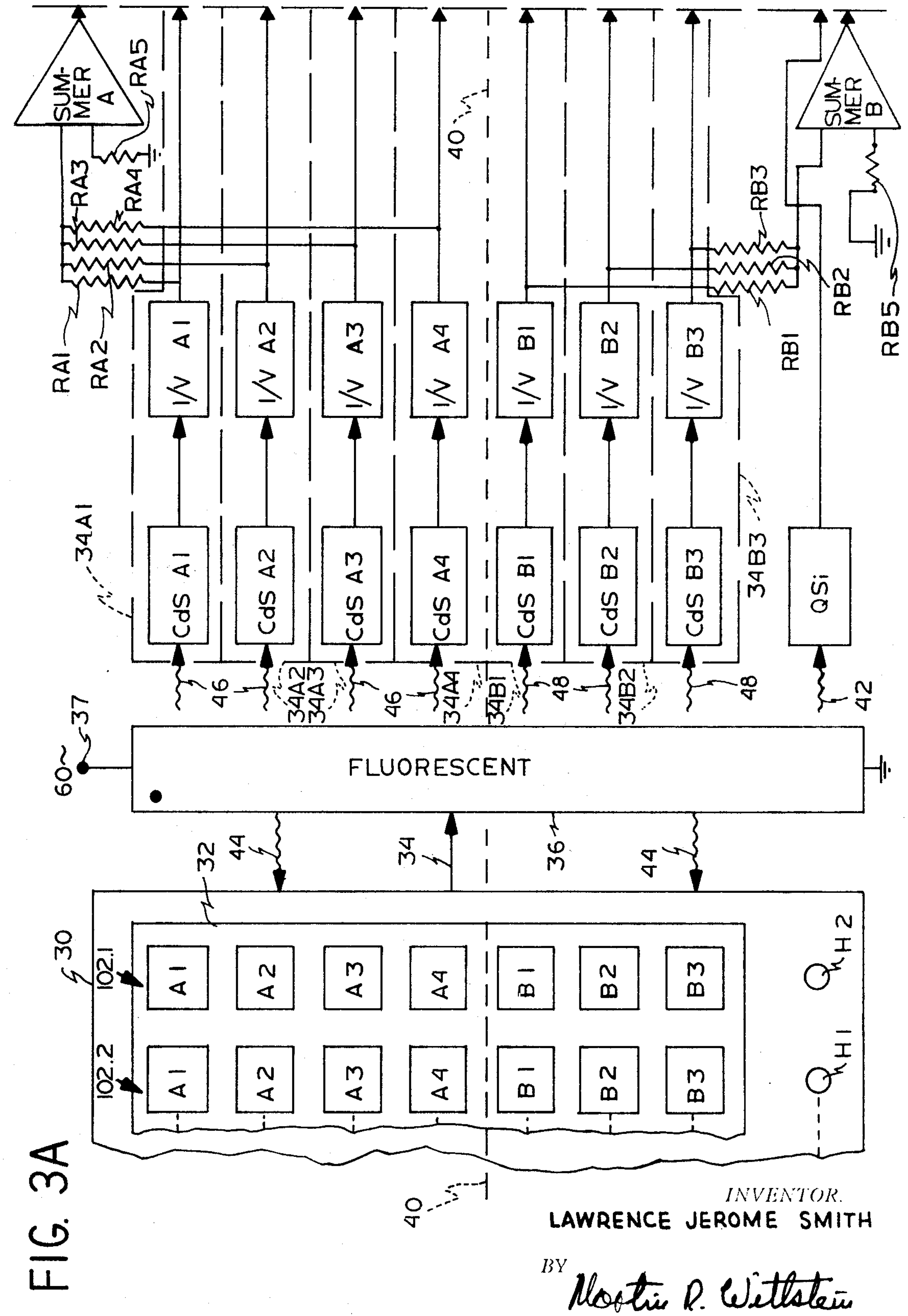
Figures 3B, 4:
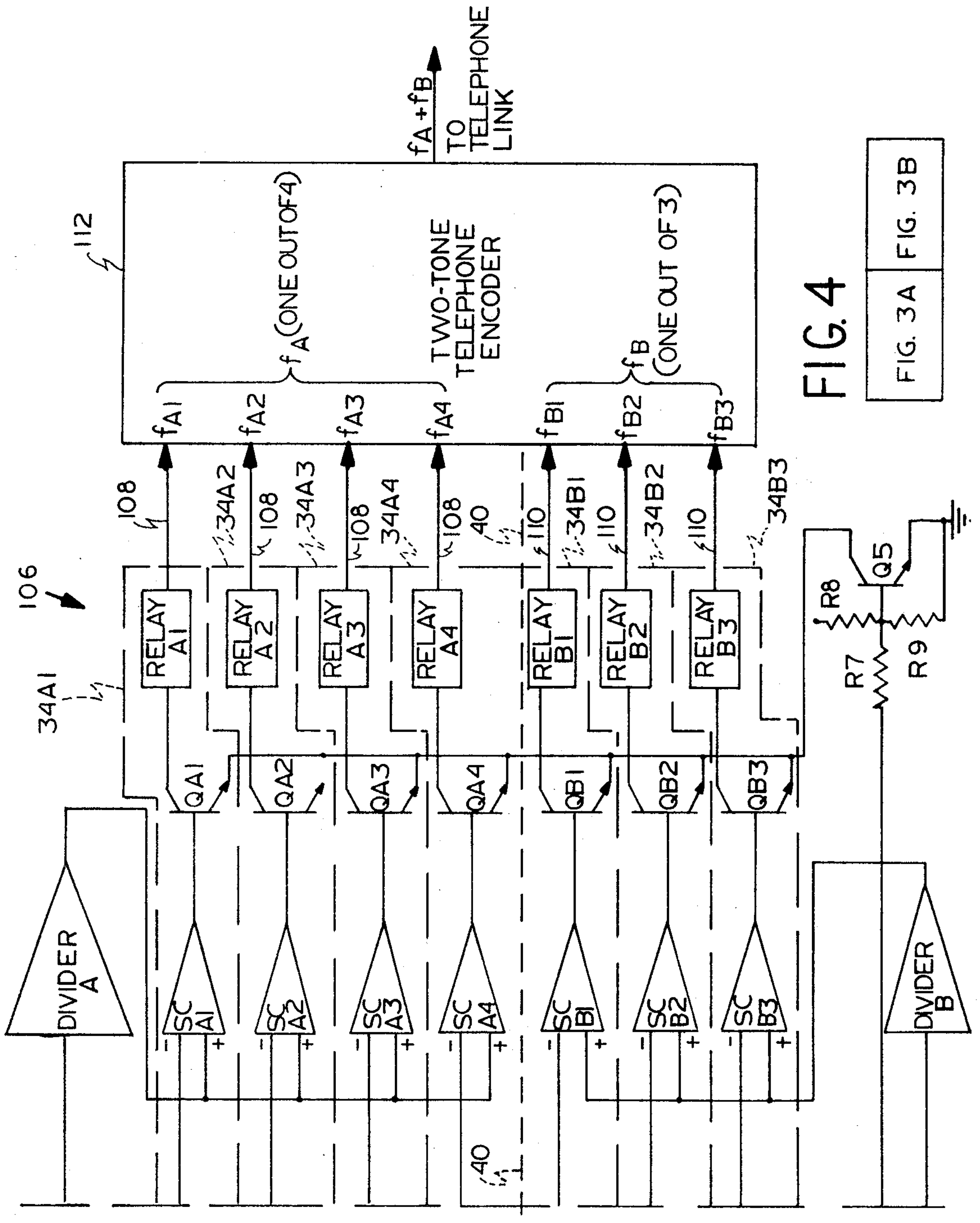

As seen in FIG. 3, the document reading device 106 of FIGS. 1 and 2 includes a movable document carrier plate 30 which supports a conventional plastic credit card, bank check, or other luminescent spot-coded document 100, and carries it through a scanning motion (arrow 104) relative to a fluorescent lamp 36 and a plurality of photo-cell CdS A1 through CdS B3. The circuitry which interprets the sensing outputs of the photo-cells CdS A1 through CdS B3 includes respective current-to-voltage converters I/V A1 through I/V B3, a pair of summer amplifiers A and B, with their respective associated resistors RA1 through RA5 and RB1 through RB5, and a pair of divider amplifiers A and B, which summer and divider amplifiers handle the entire code group A or B respectively, respective switching comparators SC A1 through SC B3, respective switching transistors transistors QA1 through QB3, a common gating transistor Q5 for both code groups A and B, and respective output relays A1 through B3. The outputs of these relays are communicated over respective cables 108 and 110, to the two-tone telephone encoder 112, which provides an output suitable for transmission over any conventional voice grade telephone link, or for application to a check processor or other data handling equipment.

The telephone code employed, whether for telephone transmission or on-site data processing purposes, is one in which each of the decimal numerals one through zero is represented by a particular combination of two frequency tones *f*A and *f*B, where *f*A is chosen from a group of four tones *f*A1 through *f*A4, and *f*B is chosen from a group of three tones *f*B1 through *f*B3. For clarity of illustration in FIG. 3, all apparatus and circuitry which related to the production of frequency tone *FA* is located above a dashed line 40, while all apparatus and circuitry relating to the production of frequency tone *f* B is located below that line.

The document 100 is provided with a plurality of columns 102.1, 102.2, etc. each comprising bit locations A1 through B3. Each column represents a single decimal digit in a sequence of such digits constituting an identifying number or other information relating to that particular document. Each column comprises a first code group of four bit locations A1 through A4 above the line 40, and a second code group of three bit locations B1 through B3 below the line. One bit location out of code group A1 through A4 is printed with a luminescent spot, corresponding to one of the frequencies *f*A1 through *f*A4 respectively; and one bit location out of code group B1 through B3 is printed with a luminescent spot, corresponding to one of the frequency tones *f*B1 through *f*B3 respectively. Thus, for each column, tones *f*A and *f*B are designated, which encode in frequency form the particular decimal digit to which the column represents.

As the scanning motion of the carrier 30 and document 100 proceeds, column 102.1 is read and the corresponding decimal digit is transmitted by encoder 112; then column 102.2 is read and its corresponding decimal digit is transmitted by encoder 112; and so on for all the following columns 102 until the entire document 100 has been read and all digits thereon have been transmitted. The velocity of this scanning motion determines the rise time of the output pulses available from photocells CdS, and normally is too slow to provide a good pulse waveform.

The decoding circuitry which receives this transmission is ordinarily designed so that the pulse envelopes of the two frequency tones *f*A and *f*B must ordinarily come on within 4 milliseconds of each other. In order to insure proper timing, therefore, the document carrier plate 30 is provided with phtoto-electric gating holes H1, H2, etc., one for each of the respective code columns 102.1, 102.2, etc. Light supplied by the fluorescent lamp 36, or by an auxiliary source of illumination, shines through each of the gating holes H, at the same time that the photocells CdS are reading the corresponding code column 102, and the light emerging through each gating hole (arrow 42) is detected by a photoresponsive device QSi to drive the common gating transistor Q5 in synchronism with each column reading operation. When Q5 is turned on in this manner, it enables all the individual channel switching transistors QA1 through QB3.

During each column reading operation, ultra-violet light represented by arrows 44 originates from the fluorescent lamp 36, and strikes all seven bit locations A1 through B3 of the column 102 which is currently being read. The particular one of the spots A1 through A4 which has luminescent material imprinted thereon then luminesces in the visible range of the spectrum, giving off light indicated by the appropriate one of the arrows 46, which strikes the associated one of the photocells CdS A1 through CdS A4. Similarly, the particular one of the spots B1 through B3 which is imprinted with luminescent material luminesces in the visible range and directs a ray of light, represented by the appropriate one of the arrows 48, toward the corresponding one of the photocells CdS B1 through CdS B3. In effect, there are two distinct code-reading operations going on simultaneously for each column 102. One such operation is the reading of a one-out-of-four code, represented by code group A, and the other is the reading of a one-out-of-three code represented by code group B. Thus one may properly refer to the A group reading operation as the decoding of a four channel code, and the B group reading operation as the decoding of a three channel code.

Using this terminology, there are four photo-electric channel reading circuits 34A1 through 34A4 for the A group and three photo-electric channel reading circuits 34B1 through 34B3 for the B code group. All of the channel reading circuits 34 are similar, in that they comprise respective photocells CdS A through CdS B3, respective current-to-voltage converters I/V A1 through I/V B3, respective binary comparators SC A1 through SC B3, respective switching transistors QA1 through QB3, and respective output relays A1 through B3 connected to respective frequency tone selection inputs *f*A1 through *f*B3 of the telephone encoder 112. Each of the four channel reading circuits 34A1 through 34A4 of code group A share a common summing amplifier A, with its associated resistors RA1 through RA5, and a common dividing amplifier A. Similarly, all three channel reading circuits 34B1 through 34B3 of group B share a common summer amplifier B, with its associated resistors RB1 through RB5, and a common divider amplifier B.

Figure 5:
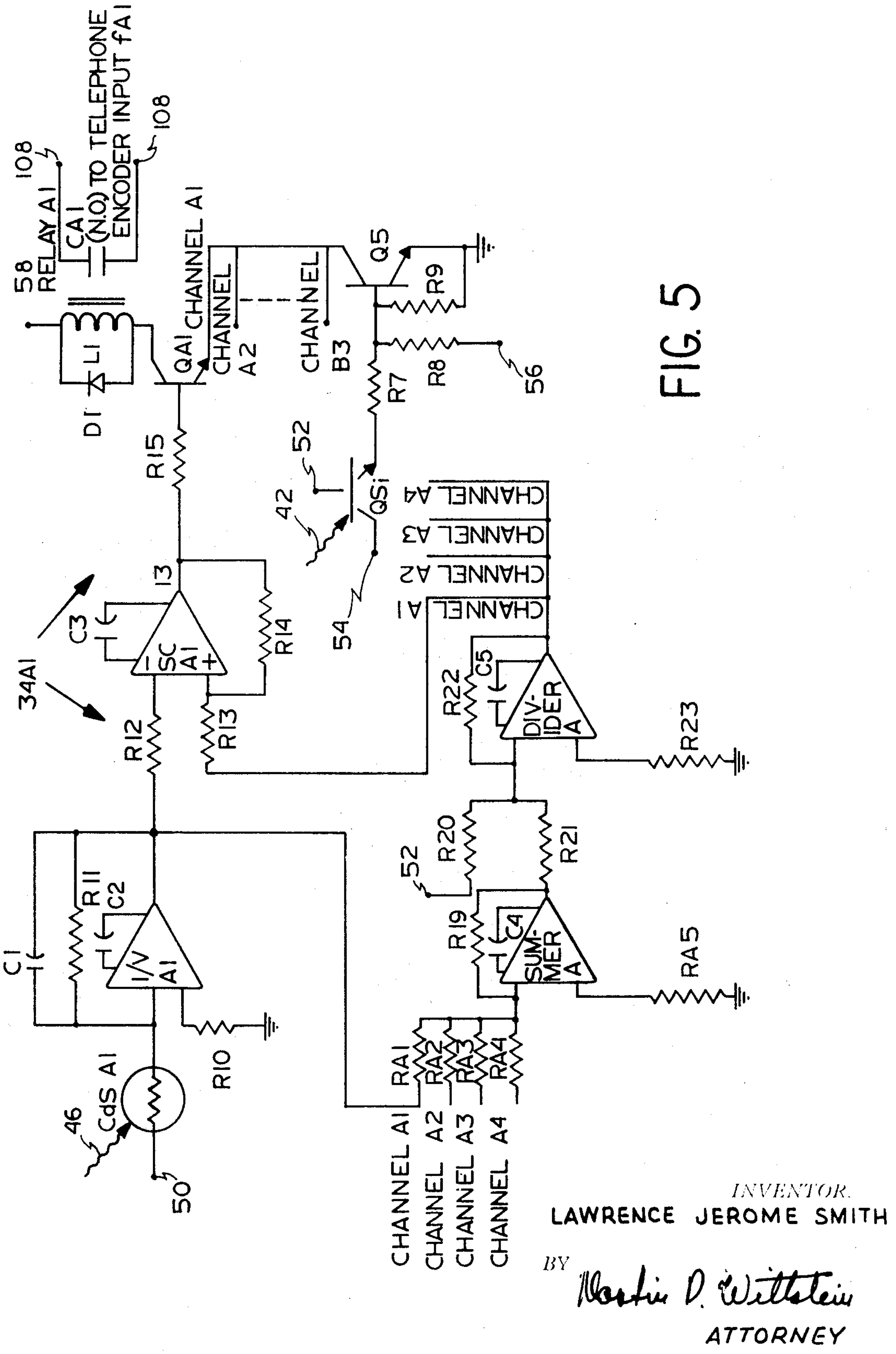
FIG. 5 is a detailed schematic circuit diagram of a typical individual code channel reading circuit employed in FIG. 3.

With this overall system description as a background, the reader's attention is directed next to the detailed operation of a particular channel reading circuit 34, which is best done in connection with the schematic circuit diagram in FIG. 5. This diagram shows a particular channel reading circuit 34A1, but it is representative in all respects of all the other channel reading circuits 34.

The luminescent radiation 46 emitted by luminescent printed spot A1, when it is activated by the fluorescent lamp 36, strikes the corresponding photocell CdS A1, which is preferably a conventional cadmium sulfide photoconductive device connected to a voltage source 50. The output of the photocell CdS A1 is connected to the current-to-voltage converter I/V A1, which is preferably a conventional operational amplifier having a roll-off capacitor C2, an input resistor R10, and an RC negative feedback network formed by capacitor C1 and resistor R11. Since the photocell CdS A1 is a photoconductive device, it produces a current signal output which is proportional to the luminescent radiation signal. The function of amplifier I/V A1, then, is to convert this current signal into a voltage signal which is coupled through a resistor R12 to the inverting input of the next operational amplifier stage SC A1. That amplifier has a roll-off capacitor C3 and a positive feedback resistor R14 causing it to operate in the switching comparator mode.

The output of amplifier I/V A1 is also coupled through resistor RA1 to the input of operational amplifier summer A, which has a roll-off capacitor C4, a negative feedback resistor R19, and an input resistor RA5 causing it to operate in the analog summing mode. This signal coupled through resistor RA1 represents the sensing output of channel A1; and in a similar fashion the sensing outputs of the three A group channels A2 through A4 are also coupled, through resistors RA2 through RA4 respectively, to the summing junction of summer A. Consequently, the output of this amplifier represents the sum of all four individual channel sensing outputs for code group A.

In order to convert this sum into an average of all the channels A1 through A4, the output of summer A is coupled through resistor R21 to the input of another operational amplifier divider A, which is connected by means of a negative feedback resistor R22, roll-off capacitor C5, input resistors R20 and R23, and a voltage source 52 to operate in an analog division mode. The output of divider A in turn is coupled, as through resistor R13, to the non-inverting inputs of all switching comparators SC A1 through SC A4 of group A.

The average of a number of quantities may be defined as the sum of those quantities divided by their number. Accordingly, if all the individual sensing outputs of channels A1 through A4 are added by summer A and divided by any desired quantity in divider A, then the output of divider A is proportional to the average of the sensing outputs of all four channels A1 through A4, the constant of proportionality depending upon the divisor employed, which is determined by the voltage on terminal 52, the value of resistor R20, and the ratio between resistors R21 and R23. For proper operation of the present circuit, it is not necessary for the output of dividers A or B to be the precise arithmetic average of the individual sensing outputs of channels A1 through A4 or B1 through B3. It is only necessary that the divider output be proportional to that average, and that the constant of proportionality be chosen to provide the desired working relationship, at the inputs to the switching comparators SC, between the outputs of the dividers and the outputs of the various amplifiers I/V.

If the voltage coupled through resistor R12 to the inverting input of the switching comparator SC A1 is more negative than the voltage coupled through resistor R13 to the non-inverting input thereof, then the operational amplifier SC A1 switches to saturation in one direction; but if the voltage coupled to the non-inverting input is the more negative of the two, then amplifier SC A1 switches to the opposite polarity. As a result, if the one luminescent spot for code group A happens to be in bit position A1, photocell CdS A1 will drive amplifier I/V A1 to produce a strongly negative output, which is coupled through resistor R12 to the inverting input of switching comparator SC A1; and also through resistor RA1 to summer A, where it cooperates with the other channel signals arriving over resistors RA2 through RA4, to produce a negative reference voltage level available from the output of amplifier divider A and coupled through resistor R13 to the non-inverting input of switching comparator SC A1. But the signal coupled through resistor R13 is less negative, because it represents the average of all four channels A1 through A4, and channel A1 is the only one which is driven by the sensing of a luminescent spot. Consequently, the input coupled through resistor R12 will prevail, and switch the comparator SC A1 to positive saturation. The resulting output of SC A1 is coupled through resistor R15 to the base of the switching transistor QA1 of channel A1.

If, at the same time, the radiation represented by arrow 42 is passed by one of the gating holes H1, H2, etc., to activate the photo-detector QSi, which is preferably a silicon phototransistor having its base and collector connected to voltage sources 52 and 54 respectively, then QSi will be turned on, and its emitter output will be coupled through voltage divider R7, R8, the opposite end of which is connected to a voltage source 56. The voltage thus developed at the junction of resistors R7 and R8 drives the base of the gating transistor Q5, which is biased by resistor R9. This turns on Q5, providing a low impedance path from emitter to ground which enables all the individual channel switching transistors QA1 through QB3.

Consequently, if the sensing of a luminescent spot by the reading circuitry for channel A1 coincides with the enabling of its switching transistor QA1, the signal coupled to the base of QA1 turns it on, and causes it to draw collector current from a power terminal 58 through coil L1 of relay A1. The coil L1 is shunted by a back-poled diode D1 for the dropping of inductive transients. When the coil is energized, it closes the associated set of normally open relay contacts CA1, resulting in an output across a pair of lines 108 which are connected to frequency tone input FA1 of the telephone encoder 112.

On the other hand, if the particular channel represented in FIG. 5 does not sense a luminescent spot, i.e., if the spot for code group A is printed in some bit position other than A1, then one of the other three channel input coupled to summer A, through one of its other input resistors RA2 through RA4, will drive summer A and divider A, instead of the channel A1 input. Therefore, the output from divider A, which is coupled through resistor R13 to the non-inverting input of switching comparator SC A1, will be at about the same negative level previously described. But the signal coupled to the inverting input thereof, through resistor R12, will be less negative because of the absence of a luminescent spot in bit position A1 to be sensed by photocell CdS A1. Accordingly, the switching comparator SC A1 will be driven to saturation in the other direction, resulting in a negative voltage output through resistor R15 to the base of switching transistor QA1. As a result, the QA1 does not turn on, even though enabled by the gating transistor Q5. It follows that relay A1 is not energized, that contacts CA1 thereof remain in their normal open condition, and there is no signal to frequency tone input terminal *f* A1 of the telephone encoder 112.

In view of the detailed circuit operation just described, which holds true also for all the other reading channels A2 through A4 and B1 through B3, it will now be appreciated that the decision as to whether a luminescent spot is or is not sensed in a particular code channel is made by the switching comparator SC of that channel reading circuit. Each switching comparator makes that decision based upon a comparison of two voltage levels: the bit sensing output signal derived directly from its corresponding channel photocell CdS and current-to-voltage converter I/V, and a reference level which is proportional to the average of that same bit sensing output and all other bit sensing outputs of the same code group (all four channels A1 through A4 or all three channels B1 through B3, as the case may be). It follows that the individual channel bit sensing output is compared, not to a fixed reference level, but to a reference level which floats, in the sense that it varies with the individual channel bit sensing output, because the individual channel bit sensing output is one of the components of the reference level.

The disadvantages of a fixed reference level is that it fails to take account of signal variations. When the individual channel bit sensing output is affected by a soiled or stained condition of the credit card, check or other document, or by 120-cycle optical hum generated by the fluorescent lamp 36, or by a poor pulse waveform, that reduces the probability that the signal level will compare favorably with a fixed reference level as determined by the switching comparator SC. The floating reference level here is in part a function of the individual channel bit sensing output, since it is one of the three or four signals averaged together to produce the reference level. Thus the reference level is affected by signal-to-noise ratio, optical hum or pulse waveform in a like manner as the individual channel bit sensing output. As a result, the probability is much greater that an accurate discrimination can be performed by each switching comparator SC.

An additional advantage of the invention arises from the fact that in certain cases there may be a poor signal-to-noise ratio situation which affects only a particular channel or channels, and which is known in advance. There may, for example, be a need for a printed stripe, a magnetic oxide strip for sensing purposes, or any other special marking which will be located in such a way that it affects only certain bit positions on the card, check or other document. In that case, the values of the particular resistor or resistors RA1 through RA4 and RB1 through RB3 corresponding to the affected channel or channels are selected so that the bit-sensing outputs coupled therethrough have the same influence upon the input to summer A or B as the bit-sensing outputs coupled through the other resistors RA1–RB3 in the same code group. In other words, a deliberate inequality between the input resistors to summer A or summer B can be used advantageously to overcome a signal-to-noise ratio problem which is predictable in advance.

It will now be appreciated that the present invention, by use of the floating reference level comparison technique, reduces the effect of signal-to-noise ratio, optical hum, and pulse waveform problems on a document sensing device. In addition, it provides a means for sensing and converting a two-group binary code into two-tone telephone dialing code for transmission to data processing equipment, especially over voice grade telephone lines to equipment at a remote location.

Since the foregoing description and drawings are merely illustrative, the scope of protection of the invention has been more broadly stated in the following claims; and these should be liberally interpreted so as to obtain the benefit of all equivalents to which the invention is fairly entitled.

The embodiments of the invention in which an exclusive property or privilege is claimed are defined as follows:

1. An N-channel code reader comprising:

N individual channel reading circuits corresponding respectively to said N channels;

said reading circuits including respective bit sensing means producing respective outputs representing the presence or absence of bits in the corresponding channels, respective binary comparators each having first and second comparison inputs, said first comparison inputs being responsive to the respective outputs of the corresponding channel bit sensing means, and respective output means responsive to a selected binary value of the respective comparator outputs;

a common summer responsive to the outputs of all N individual channel bit sensing means;

and means conveying a signal, proportional to the output of said summer, to said second comparison inputs of all N individual channel comparators;

whereby each individual channel comparator compares its respective individual channel bit sensing means output signal with a variable reference level proportional to the average of the bit sensing means outputs of all N channels.

2. A code reader as in claim 1 for a written spot code;

wherein each of said bit sensing means is a photo-electric detector.

3. A code reader as in claim 2 further comprising:

a gas discharge lamp for illuminating a spot-coded data record;

and means for connecting said lamp across an alternating current energizing source.

4. A code reader as in claim 1 wherein:

said bit sensing means comprise respective photoconductive cells;

respective current-to-voltage converter circuits are responsive to respective ones of said photoconductive cells;

and said binary comparators comprise respective operational amplifiers arranged to operate in a switching voltage comparator mode, with their respective first comparison inputs responsive to the outputs of respective current-to-voltage converters.

5. A code reader as in claim 4 wherein:

said summer comprises an operational amplifier arranged to operate in the summing mode, and has a plurality of inputs connected to the respective outputs of said current-to-voltage converters;

and said signal conveying means is arranged to convey the output of said summing operational amplifier to the second comparison inputs of all said switching comparator operational amplifiers.

6. A code reader as in claim 5 wherein said signal conveying means is an operational amplifier connected to operate in a dividing mode, whereby to divide the output of said summing operational amplifier by a predetermined quantity to develop a signal proportional to the average of said individual channel bit sensing outputs.

7. A code reader as in claim 6 wherein said output means comprise respective binary switching circuits responsive to the outputs of respective switching comparator operational amplifiers.

8. A multi-tone code converter comprising:

M reading channels corresponding respectively to M bits of a first code group designating a first frequency tone;

N reading channels corresponding respectively to N bits of a second code group designating a second frequency tone;

said channels including respective bit sensing means producing respective outputs representing the presence or absence of bits in the corresponding channels, respective binary comparators each having first and second comparison inputs, each of said first comparison inputs being responsive to the respective outputs of the corresponding channel bit sensing means, and respective output means responsive to a selected binary value of the respective outputs of the corresponding channel comparators;

a first summer responsive to the outputs of all M individual channel sensing means of said first code group;

a second summer responsive to the outputs of all N individual channel sensing means of said second code group;

means for conveying a signal, proportional to the output of said first summer, to said second comparison inputs of all M individual channel comparators of said first code groups;

means for conveying a signal, proportional to the output of said second summer, to said second comparison inputs of all N individual channel comparators of said second code group;

whereby each channel comparator compares its respective channel bit sensing means output signal with a variable reference level proportional to the average of the bit sensing means outputs of all channels of its respective code group;

and a multi-tone encoder responsive to one of said output means of said first code group to produce a first frequency tone, and responsive to one of said output means of said second code group to produce a second frequency tone.

9. A combination luminescent spot reader and multi-tone frequency code generator comprising:

means for scanning a document which is printed with a luminescent spot code wherein each coded character includes at least two code groups, each of said code groups contains a plurality of channels, and one of the channels in each code group of each character is imprinted with a luminescent bit;

a radiation source for activating said luminescent bits during scanning;

individual photo-electric bit sensing means for each channel of each code group, adapted to detect luminescent radiation from activated bits;

and individual frequency tone generating means for each channel of each code group, operable in response to their respective channel bit sensing means whereby to generate, for each coded character, a first frequency tone representative of which channel position has a luminescent bit in a first one of said code groups, and a second frequency tone representative of which channel position has a luminescent bit in a second one of said code groups, on said document, and for jointly transmitting said first and second frequency tones as a multi-tone frequency coded representation of said character.

* * * * *